(12) United States Patent
Lim

(10) Patent No.: US 12,168,532 B2
(45) Date of Patent: Dec. 17, 2024

(54) MODULAR AND CONFIGURABLE SPACECRAFT ATTACHMENT AND DEPLOYMENT ASSEMBLIES

(71) Applicant: Xtenti, LLC, Dallas, TX (US)

(72) Inventor: Daniel Lim, Glendale, CA (US)

(73) Assignee: Xtenti, LLC, Dallas, TX (US)

( * ) Notice: Subject to any disclaimer, the term of this patent is extended or adjusted under 35 U.S.C. 154(b) by 291 days.

(21) Appl. No.: 17/556,191

(22) Filed: Dec. 20, 2021

(65) Prior Publication Data

US 2022/0250774 A1 Aug. 11, 2022

Related U.S. Application Data

(63) Continuation of application No. 15/589,897, filed on May 8, 2017, now Pat. No. 11,208,218.

(60) Provisional application No. 62/332,925, filed on May 6, 2016.

(51) Int. Cl.
*B64G 1/64* (2006.01)
*B64G 1/22* (2006.01)

(52) U.S. Cl.
CPC .............. *B64G 1/641* (2013.01); *B64G 1/222* (2013.01); *B64G 1/223* (2023.08); *B64G 1/643* (2023.08)

(58) Field of Classification Search
CPC ........ B64G 1/223; B64G 1/643; B64G 1/645; B64G 1/644; B64G 1/222; B64G 1/2228; B64G 1/2229
See application file for complete search history.

(56) References Cited

U.S. PATENT DOCUMENTS

| | | | |
|---|---|---|---|
| 4,632,339 A | 12/1986 | Yuan | |
| 6,311,930 B1 * | 11/2001 | Hersh | B64G 1/222 294/82.26 |
| 9,415,883 B2 | 8/2016 | Holemans et al. | |
| 9,434,486 B1 | 9/2016 | Santos et al. | |
| 2016/0311562 A1 | 10/2016 | Apland et al. | |
| 2019/0092498 A1 | 3/2019 | Siquier et al. | |

* cited by examiner

*Primary Examiner* — Timothy D Collins
*Assistant Examiner* — Terri L Filosi

(57) ABSTRACT

A configurable spacecraft attachment and deployment system and a method of constructing a configurable spacecraft attachment and deployment system are provided herein. In one embodiment, the configurable spacecraft attachment and deployment system includes: (1) a connecting structure configured to secure at least one spacecraft to a launch interface, (2) an actuating assembly configured to constrain the spacecraft to the connecting structure before deployment thereof and release the spacecraft from the connecting structure when deployed, and (3) a deploying mechanism coupled to the connecting structure and configured to eject the spacecraft from the attaching structure, wherein the connecting structure, the actuating assembly, and the deploying mechanism are modular components and the connecting structure and deploying mechanism are selected to form the system based on parameters of the spacecraft.

17 Claims, 10 Drawing Sheets

MODULAR AND CONFIGURABLE SPACECRAFT ATTACHMENT AND DEPLOYMENT ASSEMBLIES

CROSS-REFERENCE TO RELATED APPLICATION

This application is a continuation of U.S. application Ser. No. 15/589,897, filed May 8, 2017 (now U.S. Pat. No. 11,208,218 issued on Dec. 28, 2021), which claims the benefit of U.S. Provisional Application Ser. No. 62/332,925, filed by Lim, on May 6, 2016, entitled "MODULAR AND CONFIGURABLE SPACECRAFT ATTACHMENT AND DEPLOYMENT ASSEMBLIES," commonly assigned with this application and incorporated herein by reference.

TECHNICAL FIELD

This application is directed, in general, to spacecraft and, more specifically, to attaching and deploying spacecraft from a launch interface.

SUMMARY

In one aspect, a configurable spacecraft attachment and deployment system is disclosed. In one embodiment, the configurable spacecraft attachment and deployment system includes: (1) a connecting structure configured to secure at least one spacecraft to a launch interface, (2) an actuating assembly configured to constrain the spacecraft to the connecting structure before deployment thereof and release the spacecraft from the connecting structure when deployed, and (3) a deploying mechanism coupled to the connecting structure and configured to eject the spacecraft from the attaching structure, wherein the connecting structure, the actuating assembly, and the deploying mechanism are modular components and the connecting structure and deploying mechanism are selected to form the system based on parameters of the spacecraft.

In another aspect, the disclosure provides a method of constructing a configurable spacecraft attachment and deployment system. In one embodiment, the method includes: (1) determining a number of spacecrafts to deploy, (2) selecting modular components for constructing the spacecraft attachment and deployment system based on parameters of the spacecrafts and the number of spacecrafts, and (3) connecting the modular components together to form the spacecraft attachment and deployment system.

BRIEF DESCRIPTION

Reference is now made to the following descriptions taken in conjunction with the accompanying drawings that illustrate various embodiments disclosed herein, in which.

DETAILED DESCRIPTION

Figure 1:
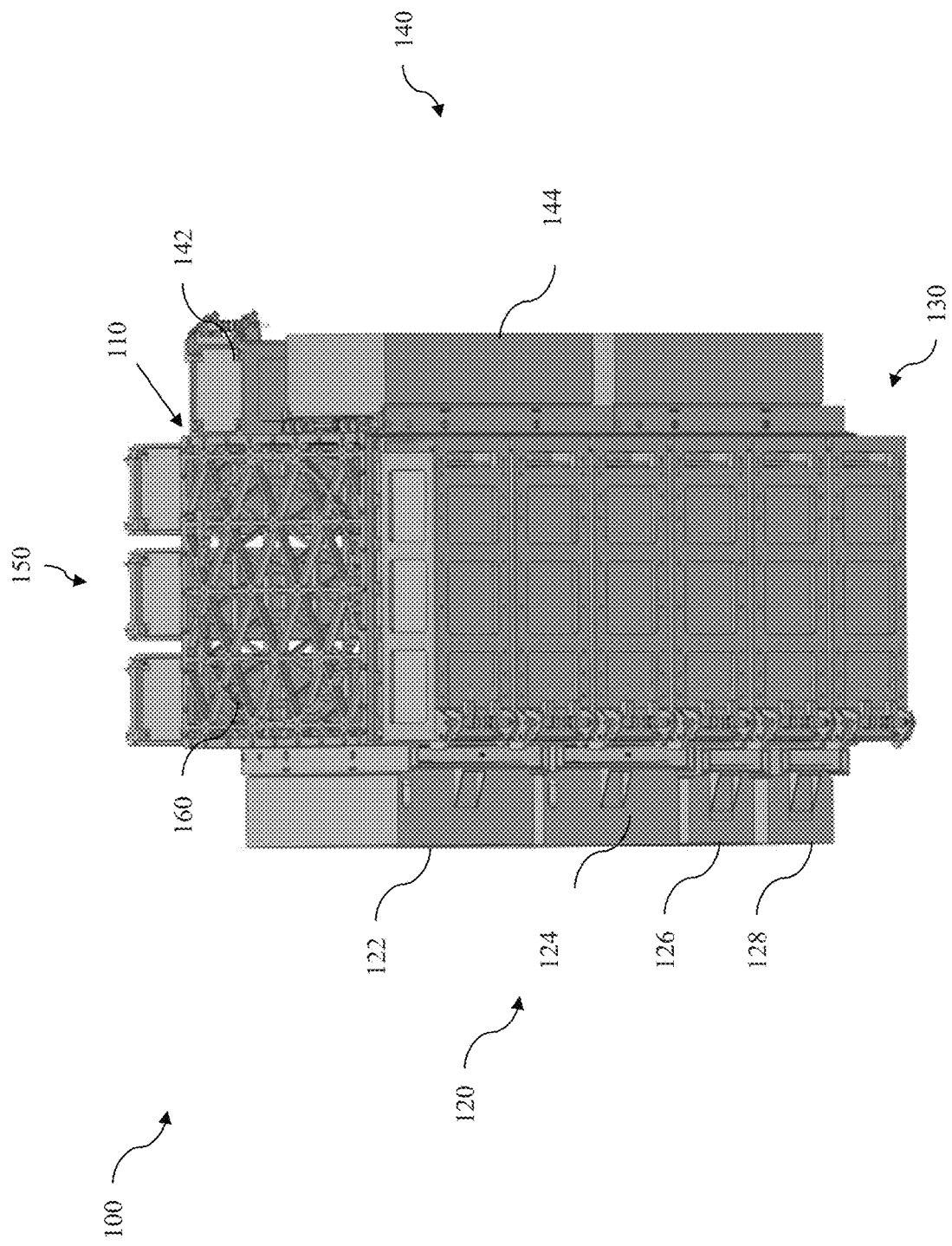
FIG. 1 illustrates a diagram of an embodiment of a system for attaching and deploying spacecraft from a launch interface constructed according to the principles of the disclosure.

This disclosure provides a unique set of hardware and methodologies associated with attaching and deploying spacecraft from a launch interface in a manner that maximizes configurability for both the spacecraft and their launch interfaces. The disclosure provides several features that allow spacecraft providers, mission integrators, and launch vehicle providers maximum flexibility during spacecraft design, as well as integration and deployment. The features disclosed herein improve on the concept of applying a preload to secure a spacecraft to its launch interface.

The disclosed attachment and deployment system is modular and has a highly configurable architecture that can secure and detach spacecrafts, such as satellites, with a lower amount of mass compared to conventional systems. Additionally, the configurable attachment and deployment system can be tailored to the physical envelope of the spacecraft to be deployed. As such, deployers can easily accommodate changes in a spacecraft design and spacecraft designers can develop designs that do not have to fit in a box, such as standard sized dispensers. Thus, unlike some existing systems that use a dispenser, the disclosure provides a spacecraft attachment and deployment system that does not require an enclosed dispenser.

As used herein, a launch interface is an interface, such as an adapter or dispenser, between a launch vehicle or host spacecraft and the spacecraft attachment and deployment systems disclosed herein. A launch interface can be a designated location of the launch vehicle or host spacecraft upon which the disclosed spacecraft attachment and deployment systems can be directly attached.

Various embodiments of a configurable spacecraft attachment and deployment system constructed of modular components are disclosed herein. Each of the embodiments includes modular components that are selected according to parameters of the spacecraft or spacecrafts that are to be deployed. The selected modular components are mechanically coupled together to form attachment and deployment systems.

The parameters of the spacecraft include physical parameters, such as, height, width, depth, and weight. The spacecraft can be a CubeSat design recognized in the industry as a cube-shaped picosatellite design of various sizes developed by Cal Poly. For example, a one unit (1U) CubeSat design is a cube of 10 cm×10 cm×10 cm with a total mass budget limit of 1 kg. The spacecraft(s) can be a 1U or multi-unit (e.g., 2U, 4U, 6U) CubeSat. The spacecraft can design-in tabs to accommodate the rails (which aligns with the growing industry interest in interfaces such as the Planetary Systems Corporation (PSC) Canisterized Satellite Deploying mechanism (CSD) system), or the satellites can be retrofitted with simple and low-weight adapter rail assemblies. Based on the parameters, the appropriate modular components can be selected to construct the attachment and deployment systems. For example, attachment and deployment systems can be constructed for 1U, 2U, . . . 6U sized spacecraft or for non-standard sized spacecraft.

The disclosed embodiments provide multiple advantageous features. One such feature is that the system allows for multiple spacecraft to be independently ejected from a single assembly. Additionally, contrary to other systems, the ejection of the spacecraft is independent from a door opening event. These features create a system that provides a flexible and effective means to attach and deploy spacecraft, such as satellites, from a myriad of different launch vehicle interfaces. Various embodiments associated with the figures will now be discussed.

FIG. 1 illustrates a diagram of an embodiment of a launching structure 100 constructed according to the principles of the disclosure. The launching structure 100 includes an adapter 110 and multiple, configurable spacecraft attachment and deployment systems mechanically coupled thereto. The launching structure 100 is configured to attach and deploy spacecraft from a launch interface.

The adapter 110 is a framed-structure configured to be mechanically connected to a launch interface and support multiple configurable spacecraft attachment and deployment systems for the deployment of spacecrafts. The adapter 110 is a four-sided, structure that can be mechanically coupled to a launch interface via a conventional means. In one embodiment, the adapter 110 is a metal, structure that is bolted to a launch interface. The adapter 110 can be a notional launch adapter.

The multiple configurable spacecraft attachment and deployment systems secure spacecraft during launch and ascent. Subsequently, the configurable spacecraft attachment and deployment systems release the spacecraft when commanded employing, for example, spring mechanisms to eject the spacecraft from the attachment and deployment systems. A conventional controller or control system typically used to deploy spacecraft, such as satellites, from a launch interface can provide the appropriate release commands or signals. The commands or signals can originate from controllers on earth or from space, such as controllers of a launch vehicle. The signals can be communicated via conventional wireless or wired typically employed in the art to operate actuators or actuating assemblies as disclosed herein. The various actuating assemblies include the necessary circuitry to receive the command signals and respond to them.

Different embodiments of the configurable spacecraft attachment and deployment systems are illustrated in FIG. 1 and are referred to as a tabbed assembly system ("T" system) and a railed assembly system ("R" system). The embodiments of the R and T systems can be, for example, integrated either within a dispenser system or independently on a suitable flat integration surface, such as within a LoadPath CubeStack adapter, a NASA Launch Adapter System (NLAS), or a launch pillar like the adapter 110.

The illustrated R and T systems provide an example of the various configurations and sizes of attachment and deployment systems that are possible with the disclosed configurable and modular systems. On a left side 120 of the adaptor 110 are several embodiments 122, 124, 126, 128, of attachment and deployment T systems. Each of the T systems 122, 124, 126, 128, is configured for a single spacecraft and positioned to eject the single spacecraft towards a backside 150 of the adapter 110. T system 122 and T system 124 are configured for a 2U sized spacecraft and T systems 126 and 128 are configured for a 1U size spacecraft.

On a front side 130 and a back side 150 of the adapter 110 several R systems are attached to the adapter 110. The six R systems on the front side 130 of the adapter 110 are positioned to deploy spacecraft towards the left side 120 of the adapter 110 and the three R systems on the back side 150 of the adapter 110 are positioned to deploy their spacecraft downward away from a bottom side (not shown, opposite side of top side 160) of the adapter 110.

On the right side 140 both an R system 142 and a T system 144 are attached to the adapter 110 and positioned for an upward ejection of spacecraft therein away from the top side 160. The R system 142 and T system 144 are two deep systems constructed to have two spacecraft in a serial configuration e.g., a front side of a second spacecraft to be ejected is next to or behind a back side of a first spacecraft to be ejected. Advantageously, the R system 142 and the T system 144 can independently release the stowed spacecrafts at different times.

Figure 2:
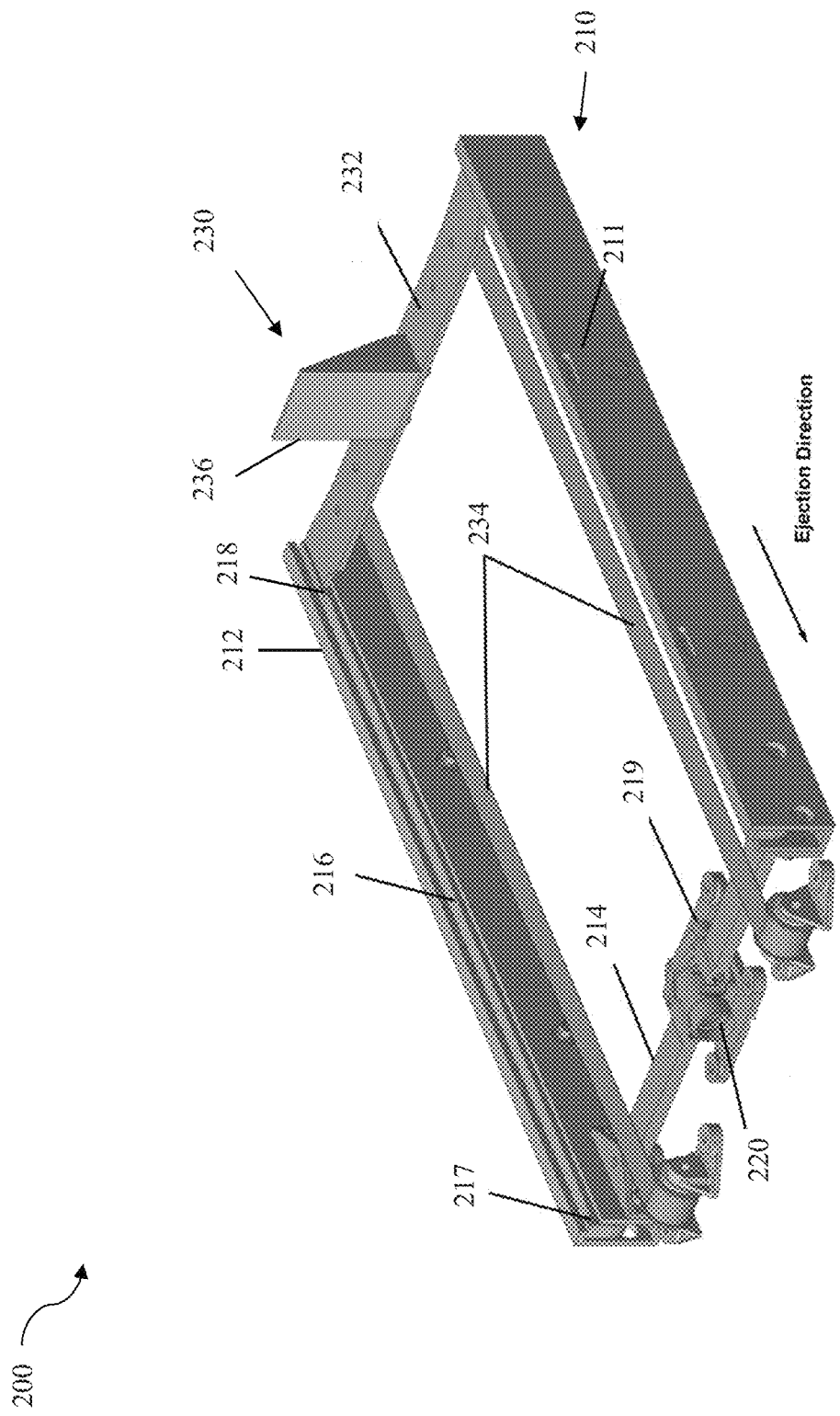
FIG. 2 illustrates a diagram of one embodiment of a configurable attachment and deployment system for a spacecraft constructed according to the principles of the disclosure.
Figure 3:
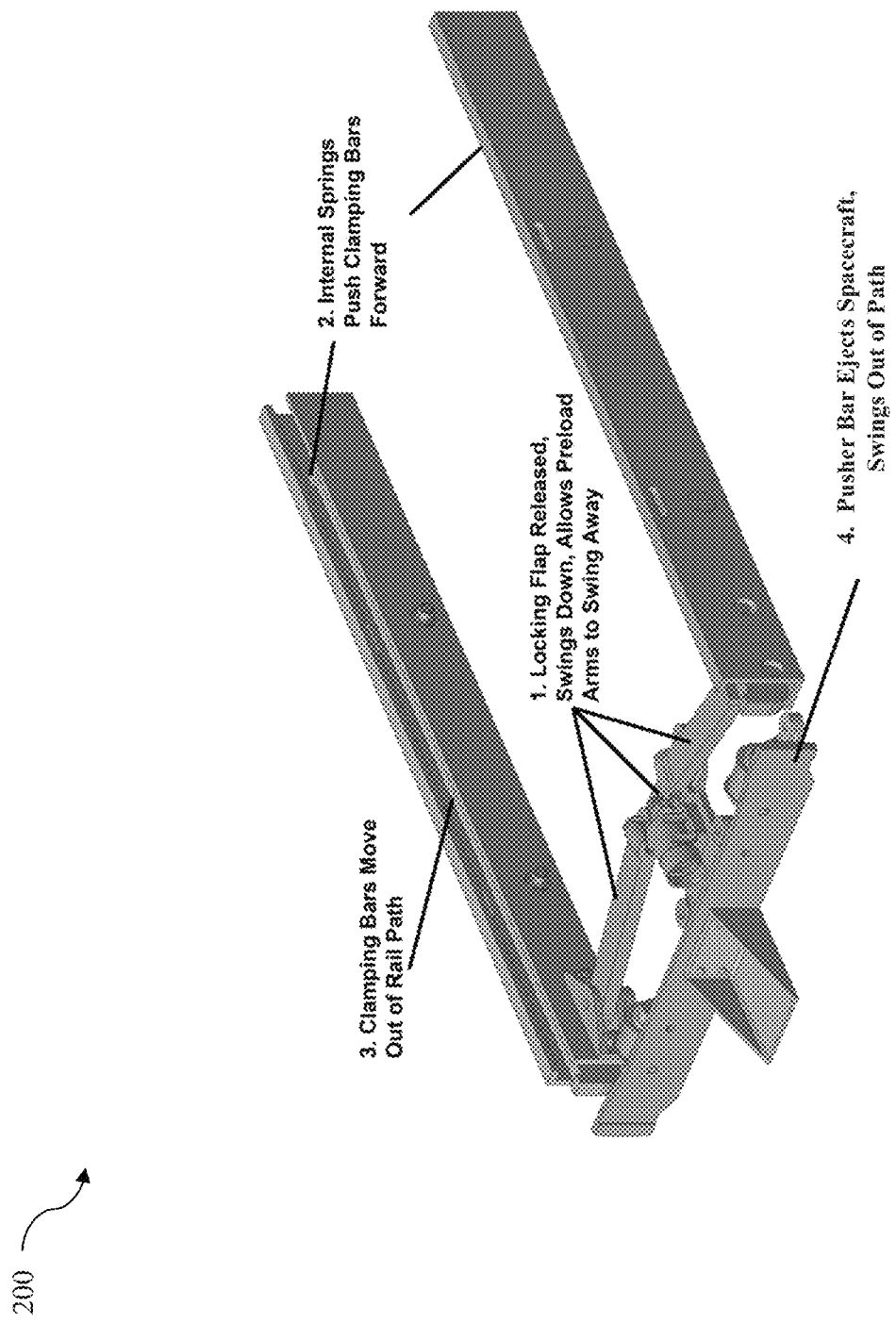
FIG. 3 illustrates various steps of an embodiment of a deployment event and the end result after deployment of the configurable attachment and deployment system of FIG. 2.

Turning to the various embodiments, the T systems include a connecting structure having two rails that allow a deploying mechanism to eject one or more spacecraft. As shown in a single spacecraft configuration in FIG. 2 and FIG. 3 and a two-deep version in FIG. 4, the deploying mechanism includes a pusher bar. FIG. 2 illustrates a diagram of an embodiment of a T system 200, constructed according to the principles of the disclosure, in a stowed state and FIG. 3 illustrates T system 200 in a deployed state.

The T system 200 includes a connecting structure 210, an actuating assembly 220, and a deploying mechanism 230. The connecting structure 210 includes two rails 211, 212, that are mechanically connected to a launch interface. The connecting structure 210 also includes a pre-load bar 214, clamping bars wherein one clamping bar 216 is illustrated, and a locking flap 219.

For the T system 200, different options can be employed. For example, the spacecraft stowed therein can design-in tabs to accommodate the rails 211, 212, to comply with the growing industry interest in interfaces, such as the PSC CSD systems. The spacecraft can also be retrofitted with simple and low-weight adapter rail assemblies to correspond to the rails 211, 212.

Advantageously, the connecting structure 210 applies a preload to the tabs to secure the spacecraft to the launch interface surface to reduce vibration of the spacecraft during launch and ascent. The preload can be applied according to conventional methods such as employed in the PSC CDS systems. A rail preload mechanism can be used to apply the preload by applying a clamping preload to the rails 211, 212 using a presser rail as it is locked into place with pivoting forcing bars. The pressing bar presses onto the rails 211, 212, when it is pushed up the ramped interface between the clamping bars and two adjustable support cams of the rails 211, 212, as the pivoting forcing bars are engaged. A rounded end of the forcing bars engages a clamping channel of the clamping bars to move it backward up the ramp, which engages with the spacecraft tab and secures the spacecraft during launch and ascent. The forcing bars can be secured in a locked position by a pre-load locking assembly that includes a locking flap 219. The locking flap 219 is held by the actuating assembly 220. In the illustrated embodiment, the actuating assembly 220 is a frangible bolt system. In other embodiments, the actuating assembly 220 can be another type of actuator, such as a tension release valve.

The deploying mechanism 230 can include a pusher bar 232 that is pulled by a constant velocity mechanism, such as two constant velocity springs 234, to provide a consistent delta velocity for the spacecraft upon initiation of the deployment event through a dual redundant release mechanism.

The actuating assembly 220 is configured to release a stowed spacecraft when commanded. A conventional communication system can be employed to communicate a release command to the actuating assembly 220. For example, when the T system 200 is commanded to release the spacecraft, the frangible bolt of the actuating assembly 220 is severed, allowing the flapper 219 to swing down by a torsional spring. When the flapper 219 flips down, the two forcing bars are allowed to swing inboard, and the clamping bars are pushed forward and down along the ramped interface of the rails 211, 212, with the two support cams by a clamping bar spring. As the clamping bars are pushed forward and down, the preload on the spacecraft tabs are released, allowing the constant velocity spring 234 to pull the pusher bar 232 and attached push pillar 236 to eject the spacecraft forward and out. Different sized deployment mechanisms 230 can be employed based on the weight of the spacecraft or spacecrafts to be ejected. For example, stronger springs, pusher bar, and multiple push pillars can be used for heavier spacecraft.

Figure 5:
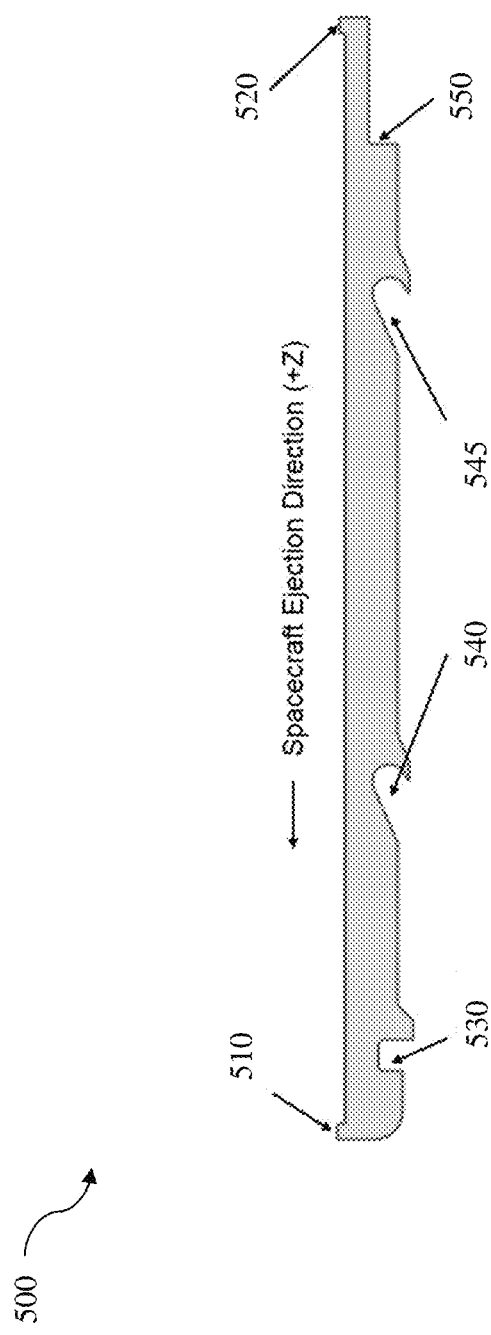
FIG. 5 illustrates a diagram of an embodiment of a clamper bar constructed according to the principles of the disclosure.

Unlike conventional clamping bars used with, for example PSC CSD system, the disclosed clamping bars include two movement restriction tabs 217, 218, that are incorporated thereon at locations fore and aft of a stowed spacecraft to restrict spacecraft movement in the ejection and anti-ejection directions. These preload tabs are shown in FIG. 5 and prevent or at least reduce the chance of a spacecraft creeping or moving out of the clamping mechanism in those two directions during the vibration and shock environments typically experienced during launch and ascent. These movement restriction tabs 217, 218, are designed such that when the rail assembly of the connecting structure 210 is actuated to the release mode, the restriction tabs are retracted enough to allow for free travel of the spacecraft tabs along the rails 211, 212, in the ejection direction.

In some embodiments, the two support cams of the rails 211, 212, include a bearing on an elliptical cam that allow for a low friction rolling interface up the ramped interface between the clamping bar and the support cams to actuate the clamping force on each rail assembly side. A camming action is achieved by offsetting the centerline of the bearing from the cam bolt itself. When installed in the rail assemblies, the support cams can be adjusted by a flat head driver slot to apply more or less clamping preload of the clamping bar against the spacecraft tab. Button load cells are loaded in the slots to gauge the amount of preload applied to the spacecraft tabs during the physical integration of the spacecraft with the T systems. The amount of preload on the tabs can be calculated beforehand based on analyses of the expected loads and dynamics environment during launch and ascent.

Figure 4:
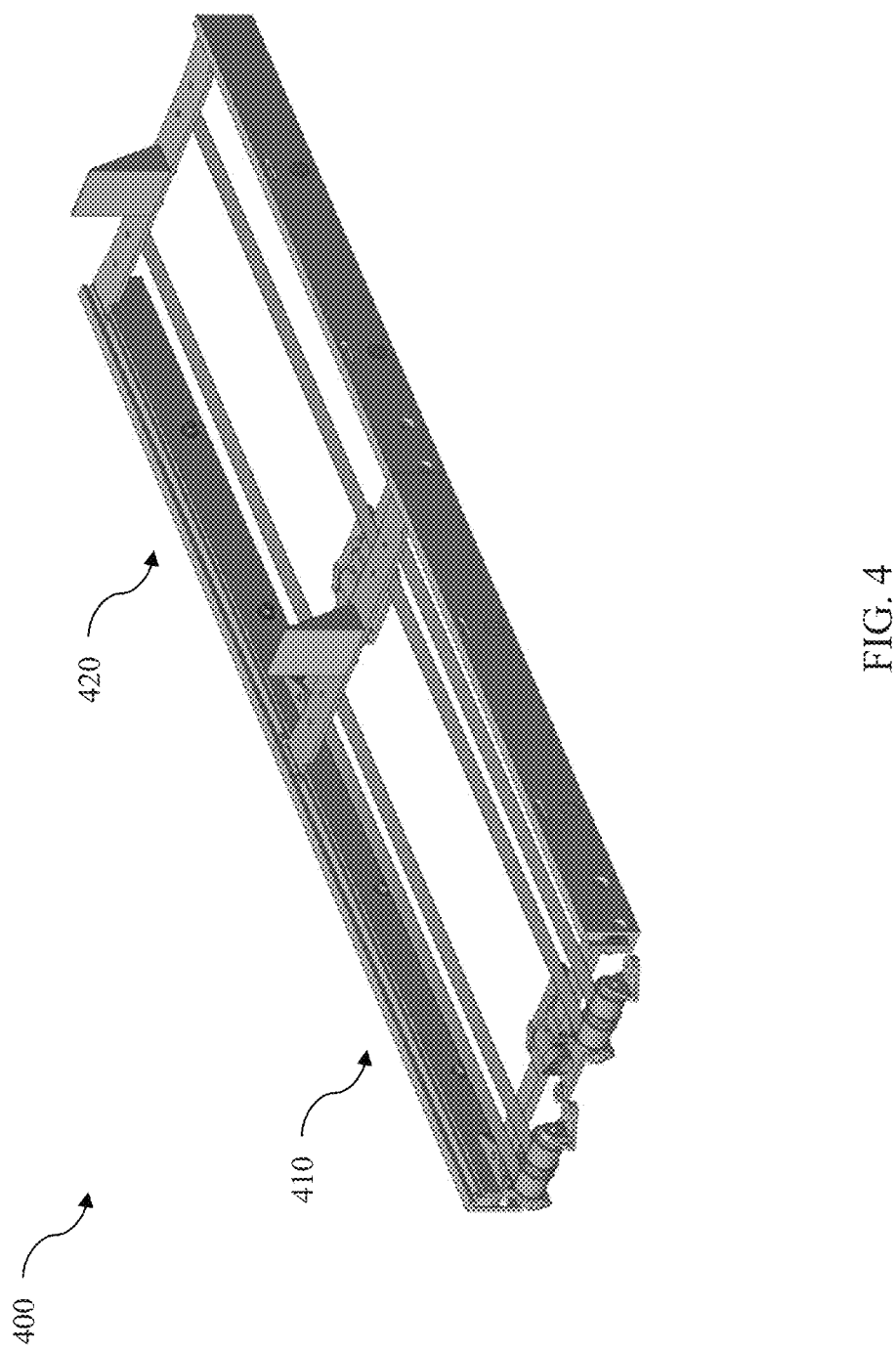
FIG. 4 illustrates a diagram of an embodiment of a configurable attachment and deployment system for a dual spacecraft before deployment.

FIG. 3 illustrates the various steps of one embodiment of different steps of a deployment event and the end result of the T system 200 after deployment. Both FIG. 2 and FIG. 3 illustrate a single deployer, T system 200. FIG. 4 illustrates a T system 400 that is a dual deployer. As such, T system 400 includes two single deployers connected together. The two single deployers 410, 420, can be the single T system 200. The single deployers 410, 420, can be bolted together. T system 400 illustrates the configurability of the attachment and deployment systems disclosed herein.

FIG. 5 illustrates a diagram of an embodiment of a clamper bar 500 constructed according to the principles of the disclosure. The clamper bar 500 advantageously includes a movement restriction tabs or locking tabs denoted as forward locking tab 510 and aft locking tab 520. The clamper bar 500, which can be used as the clamper bar 216 in FIG. 2, also includes a bar channel 530, ramped support cam interfaces 540, 545, and a spring indentation 550 that corresponds to placement of a bar spring. As noted above, the forward locking tab 510 and the aft locking tab 520 assist in or prevent a spacecraft from moving in the +Z or −Z direction when stowed.

Figure 6:
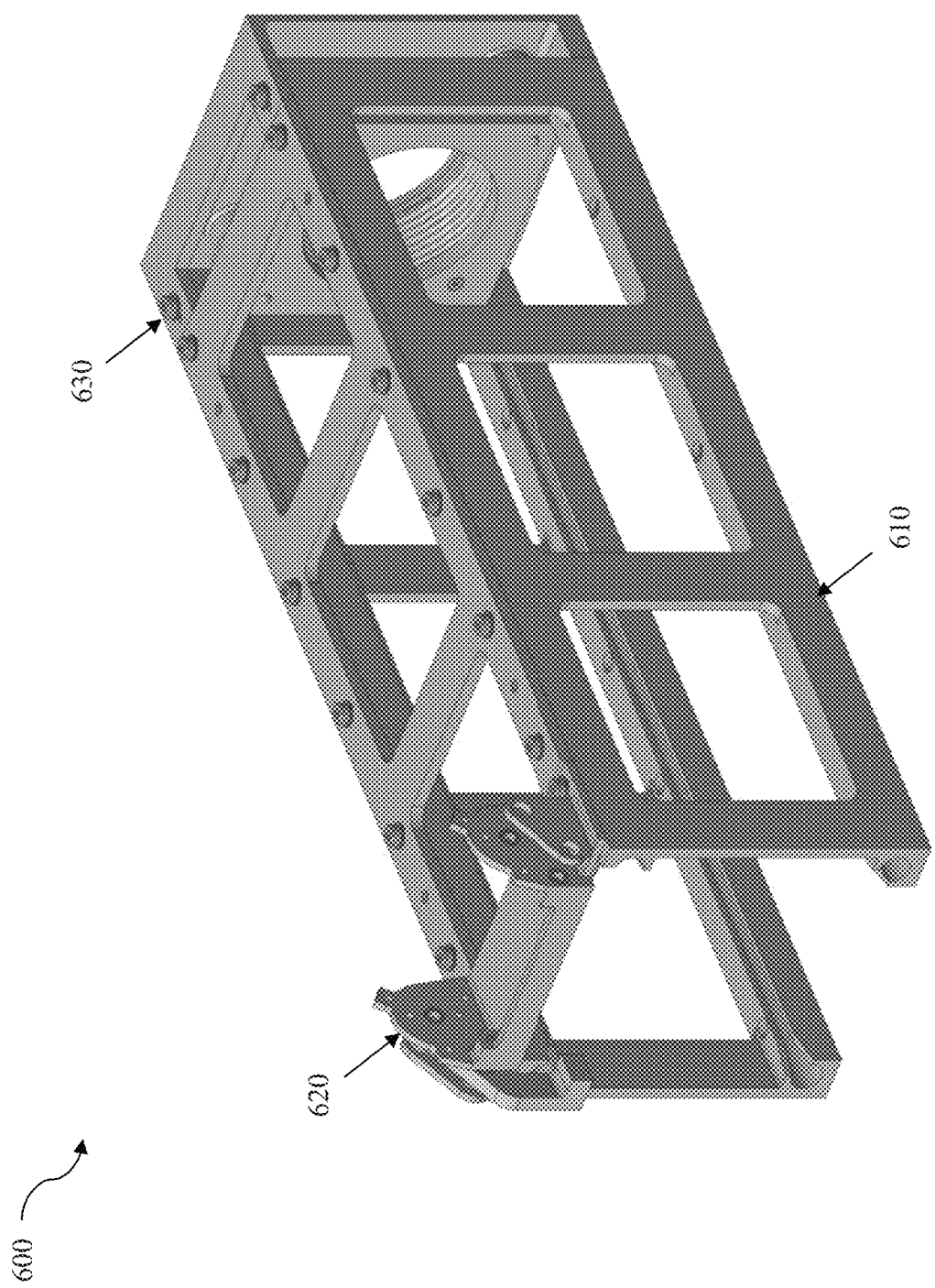
FIG. 6 illustrates a diagram of another embodiment of configurable attachment and deployment system constructed according to the principles of the disclosure.

Turning now to an R system, FIG. 6 illustrates an embodiment of an R system 600 constructed according to the principles of the disclosure. Like the T system 200, the R system 600 also includes a connecting structure 610, an actuating assembly 620, and a deployment mechanism 630. The system 600 is a modular attachment and deployment system that can stow and deploy one or multiple spacecraft. Advantageously, the actuating assembly can control independent release of multiple spacecraft stowed therein or can allow multiple spacecraft to be released in a same deployment event. The same deployment mechanism 630 can be used for a single deployment event or multiple deployment events.

Figure 8:
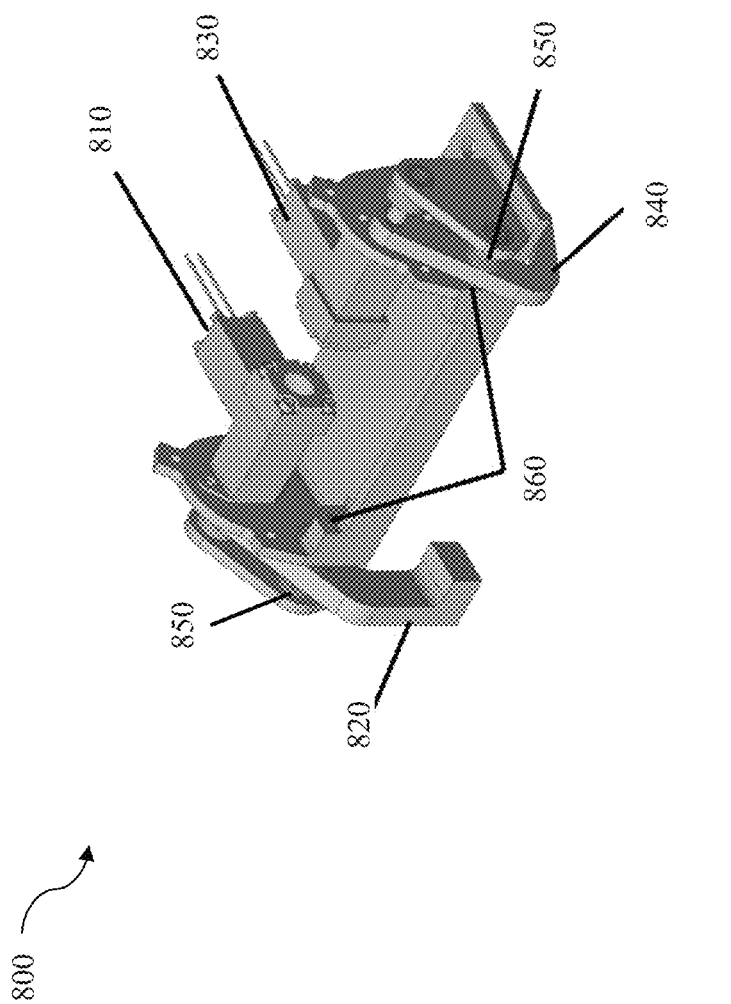
FIG. 8 illustrates a diagram of an embodiment of an actuating assembly constructed according to the principles of the disclosure.

The actuating assembly 620 utilizes a modular release mechanism that is attached to a top of the connecting structure 610 at an exit end thereof. The modular actuating assembly 620 can also be attached to other sides, i.e., left, right, or bottom, of the connecting structure 610 at the exit end depending to the needed or desired configuration. The actuating assembly 620 is a mechanism that controls, constrains and releases, deployment of spacecraft stowed in the connecting structure 610. The actuating assembly 620 includes a pin puller and flapper arm to constrain and release spacecraft. In other embodiments, the actuating assembly 620 can include multiple flappers for controlling spacecraft deployment. FIG. 8 provides more detail of an actuating assembly.

Figure 7:
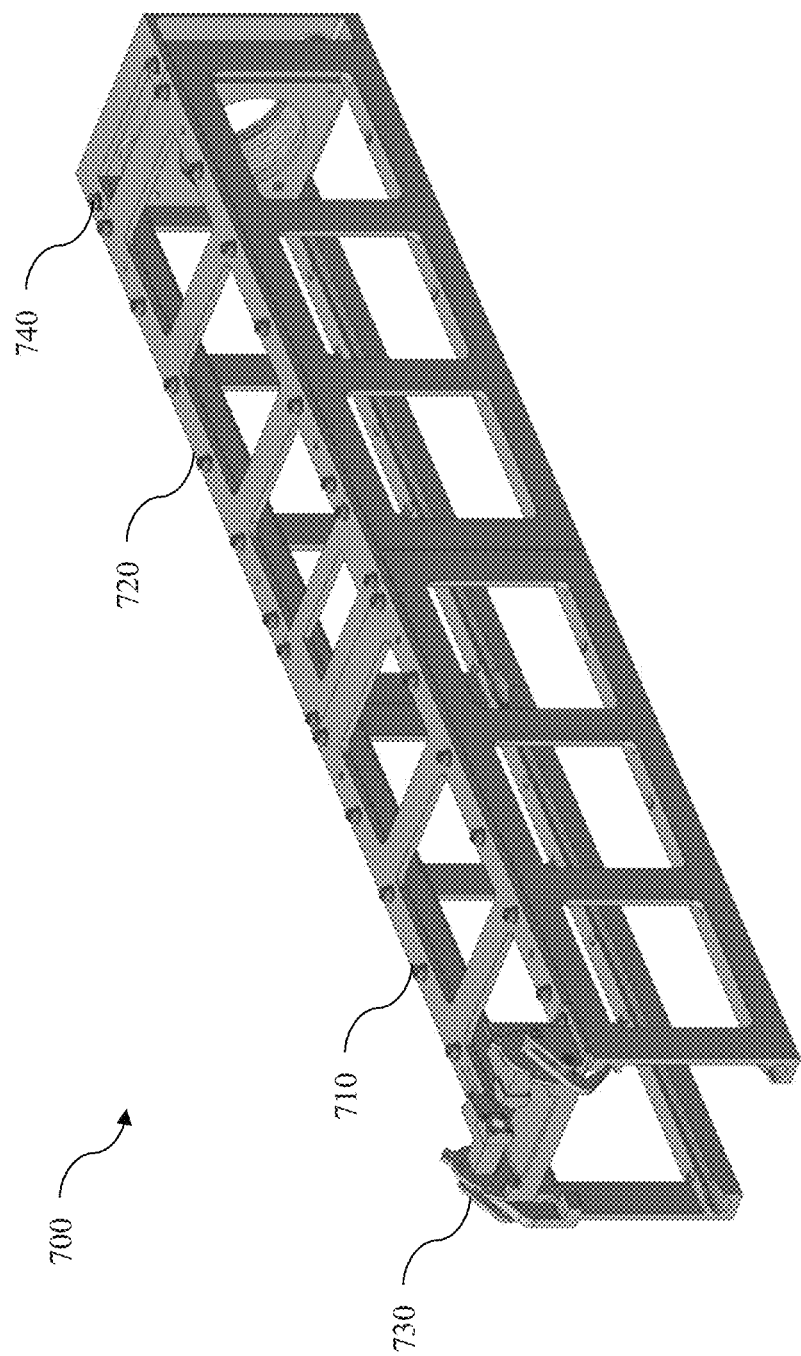
FIG. 7 illustrates a diagram of an embodiment of a configurable attachment and deployment system for serial deployment constructed according to the principles of the disclosure.

The deploying mechanism 630 is a modular pusher sub-assembly that can be bolted to the rear of the connecting structure 610. The deploying mechanism can also be connected to one or more connecting structure to form a serial R system as shown in FIG. 7. The springs of the deploying mechanism 630 can be interchanged depending on the required stroke if the configuration is one or two spacecraft deep, such as 3Us deep, or if a customer desires a certain band of separation velocities for their spacecrafts.

FIG. 7 illustrates a diagram of an embodiment of a serial R system 700 having two connecting structures 710, 720, connected together. The serial R system also includes an actuating assembly 730 and a deploying mechanism 740. The deploying mechanism 740 can be the deploying mechanism 630 and the actuating assembly 730 can be the actuating assembly as described in FIG. 8.

FIG. 8 illustrates a diagram of an embodiment of an actuating assembly 800 constructed according to the principles of the disclosure. The actuating assembly 800 can be used to independently eject spacecraft in a R system, such as the R system 600 or 700. The actuating assembly 800 includes a primary pin puller 810, a primary spacecraft stop lever 820, a secondary pin puller 830, a secondary spacecraft stop lever 840, torsion springs 850, and lever pivot points 860.

Figure 9:
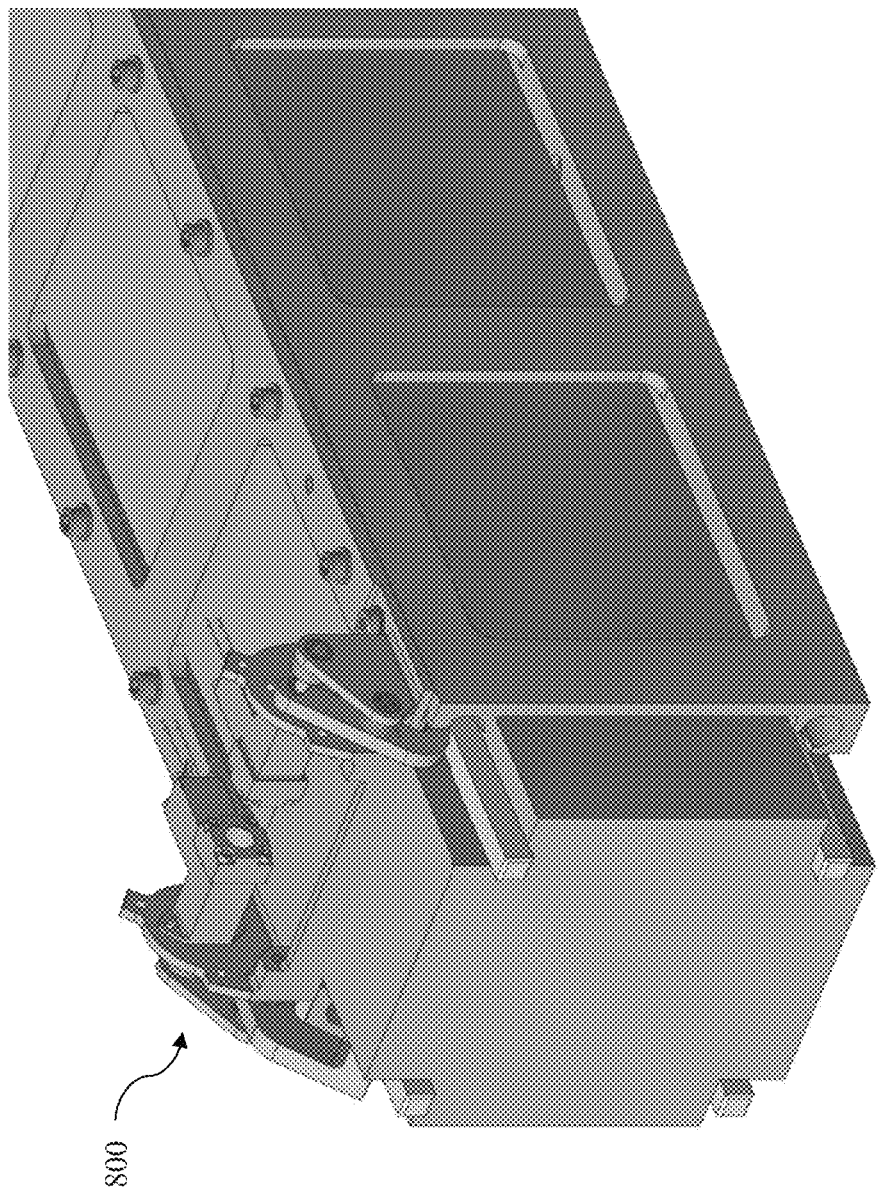
FIG. 9 illustrates an example of the interaction of the stop levers of the actuating assembly of FIG. 8 with the rails of the spacecraft.

Multiple spacecraft can be constrained by the Primary Stop Lever 820 during launch and ascent. The Secondary Stop Lever 840 contacts the opposite spacecraft rail and rides along the rail during ejection of the spacecraft. Contact for the levers 820, 840, is maintained by each particular torsion spring 850 at the particular lever pivot points 860 for each of the levers 820, 840. FIG. 9 illustrates an example of the interaction of the stop levers 820, 840, with the rails of the spacecraft.

An electrical signal via conventional means and control systems is sent to the Primary Pin Puller 810 to allow the Primary Stop Lever 820 to swing up and out of the way of the front spacecraft by means of a torsion spring 850 at the lever pivot point 860, allowing a deployment mechanism, such as a deployment mechanism 630, to move both spacecrafts toward the deployer exit wherein the front spacecraft is ejected.

The Secondary Stop Lever 840 catches the small gap between the Front and Rear spacecraft to arrest the Rear spacecraft. The Secondary Stop Lever 840 is restrained from opening all the way by the Secondary Pin Puller pin 830. The Rear spacecraft is restrained from ejection by the Secondary Stop Lever 840.

Another electrical signal is sent to the Secondary Pin Puller 830 to allow the Secondary Stop Lever 840 to swing up and out of the way of the Rear spacecraft by means of a torsion spring 850 at the lever pivot point 860, allowing the deployment mechanism to move the Rear spacecraft toward the deployer exit to eject the Rear spacecraft.

Since the disclosed T and R systems are designed to be fastened to a flat launch vehicle interface, the disclosed systems can be configured to accommodate a wide variation of spacecraft dimensional requirements. For instance, a T system designed for a tabbed 3-unit (3U) CubeSat spacecraft adhering to the PSC CSD interface can be quickly re-configured to accommodate a wider 6U CubeSat utilizing the majority of the same hardware, while changing out some parts such as the pivot arms to a longer variant for the larger spacecraft. This reconfigurable architecture affords the spacecraft providers great flexibility into the design of their spacecraft in terms of dimensional constraints. For example, a spacecraft provider can allow for growth in the width of their spacecraft, and the attachment and deployment systems can be tailored to fit the change in spacecraft dimensions. This is a marked difference between a fixed attachment/deployment mechanism, typically within a closed dispenser. Oftentimes, a spacecraft provider is faced with the need to grow their design to accommodate the payload and faces the challenge of down-sizing components to fit within a specified dimensional constraint, especially for small satellites. The flexibility of the configurable attachment and deployment architectures allows for the spacecraft provider to grow their dimensions by adjusting the width of the rails of either an R or T system to accommodate the changes.

Additionally, since the architecture is bolt-on, the configurable systems can be fastened to a wide variety of launch vehicle interfaces. For instance, the assemblies can be affixed within a dispenser if needed, or externally on an adapter like illustrated in FIG. 1. It can also be directly affixed to a launch vehicle structure, as well, such as on a Surfboard location. This provides the launch vehicle provider and mission integrator the maximum flexibility to launch more spacecraft without the added mass of a whole dispenser or container system.

The configurable attachment and deployment systems are completely modular, therefore allowing for the joining of two rail assemblies to eject two spacecraft in serial from one set of rails as shown in FIG. 1 for both R and T systems, in FIG. 4 for the T system, and in FIG. 7 for the R system. These serial configurations of two-deep variants allow for the independent ejection of spacecraft in, for examples, 3U (or 6U) increments.

Both the T and R systems can utilize frangible bolt systems as actuating assemblies to actuate the release mechanisms that allow the spacecraft to eject from the rail assemblies. The disclosed T systems generally adhere to the requirements from the PSC CSD specifications, and the disclosed R systems are designed to envelope the requirements set forth in the Cal-Poly P-POD and the Nanoracks deploying mechanism specifications. A payload users' guide can also be employed that bounds the requirements for the rail assemblies.

The R systems can utilize a single pusher spring, similar to the deploying mechanisms for the Cal Poly CubeSat standard for a deploying mechanism. The T systems can utilize a constant velocity mechanism, such as constant velocity pull springs, for deploying mechanisms. For example, a tape spring that pulls objects as it retracts may be used.

The embodiments disclosed herein of both the T and R systems provide a substantial mass savings with respect to the comparable dispensers on the market. As a result, these mass savings can provide customers the ability to fly additional spacecraft on a particular manifest that would otherwise be wasting mass on interface hardware. This provides an attractive premise to providers, especially of those launching multiple spacecraft. The configurable attachment and deployment systems trade off containerization for mass savings, which is ideal for situations that do not require canisterization, such as within a dispenser or within a small payload fairing of a small-class launch vehicle.

As described earlier, the bolt-on capability of the rail assemblies of the T and R systems increase the spacecraft dimensional design flexibility in the width (X) direction. However, the design of the architecture itself allows for spacecraft dimensional growth in five of the six spacecraft dimensions. The modular architecture allows for growth in the height (Y) dimension, and the systems can also allow for growth in the depth (Z) direction, as well, with the only constrained direction in the −Y direction. This is readily apparent for the T systems, however, since the side and top plates for the R systems are bolt on and modular, mission specific modifications can be made to the side and top panels to allow for spacecraft volume growth and/or protrusions, such as deployable solar panels or antennae, as well as for shields and boom devices. This is in distinct contrast to the dimensional constraints imposed by utilizing a container or dispenser system with fixed attachment/deployment mechanisms. The open and modular design potentially saves spacecraft providers development dollars that would be spent on compacting their spacecraft design within a specific dimensional constraint.

As mentioned earlier, both T and R systems can be configured to independently eject multiple spacecraft on a single rail kit. The flexibility in the depth (Z) direction allows for the ability to "stack" a variety of spacecraft along the rail length. For a T system the number of independent ejection events is determined by the number of constant velocity springs that can be integrated into the system to pull the spacecraft pusher bar forward to eject the spacecraft. This feature of the architecture is desirable for spacecraft providers that require precise ejection timing of their spacecraft, for instance, to impart sufficient distance and spread of spacecraft that form a constellation of satellites.

In terms of release of spacecraft from R systems, the systems utilize a modular and common upper release mechanism, as shown in FIG. 8. The actuating assemblies are bolted to the front of one or more R systems in serial and provides multiple independent release actuations.

In a dual R system configuration, the rear spacecraft is pushing on the front spacecraft at the four rails as the rear spacecraft is pushed by the deploying mechanism, a single compression spring against a push plate. It can be expected that there will be degradation of the spring force as it strokes forward. As such, the spring can be sized to accommodate the length to provide enough push force to impart the desired delta velocity for the spacecraft. Also, because the pusher/spring subassembly is modular, the specific desired spring force can be accommodated with minimal impact to the R system development.

For the dual T systems, since there are two independent actuating assemblies, as depicted in FIG. 4, in one embodiment the command to release the front spacecraft only allows for the dropping of the clamping bars for the forward T system only for the ejection of the forward spacecraft; the aft spacecraft remains stowed. That is, the rear clamping bars remain engaged during the deployment of the forward spacecraft. Once the forward presser bar and push pillar completes its ejection stroke, the T system is designed with a mechanism height to ensure that the push subassembly is cleared out of the way to ensure clearance for the aft ejection.

Since the T system employs constant velocity springs in one embodiment versus conventional compression springs, the ejection force for each spacecraft should be uniform throughout the entire stroke of the deployment sequence. Furthermore, since the front and aft rail kits are independent, there will not be any shock events for either spacecraft due to contact between front and rear spacecraft. Operation of the actuating assembly, such as the breaking of a frangible bolt, can only potentially transmit some low level of shock through the mounting surface of the rail kits and a miniscule amount transmitted from the point contact from the preloading bars through the clamping bars to the spacecraft tabs.

Moreover, conventional spacecraft dispenser systems that deploy spacecraft along rails and tabs tie the spacecraft deployment event with the dispenser door opening event. As disclosed herein, the disclosed systems de-couple those two events to give mission integrators and spacecraft providers the ability to gain total control over the timing of the independent ejection events of all of the spacecraft integrated to the set of rails, as well as the timing of the ejection events of the aggregated set of spacecraft on a particular launch manifest. The alternative systems on the market to date eject spacecraft in a "shot gun" fashion, where the door opening releases the spacecraft attachment and/or deployment system and pushes all the integrated spacecraft in one event. This differs from the disclosed configurable attachment and deployment system's capability to deploy spacecraft independent of a door opening that gives mission integrators and spacecraft providers the maximum flexibility to tailor the spacecraft separation timing to meet mission objectives and to aid in the avoidance of collision of spacecraft with other spacecraft and/or the launch vehicle during its early orbital precession.

Figure 10:
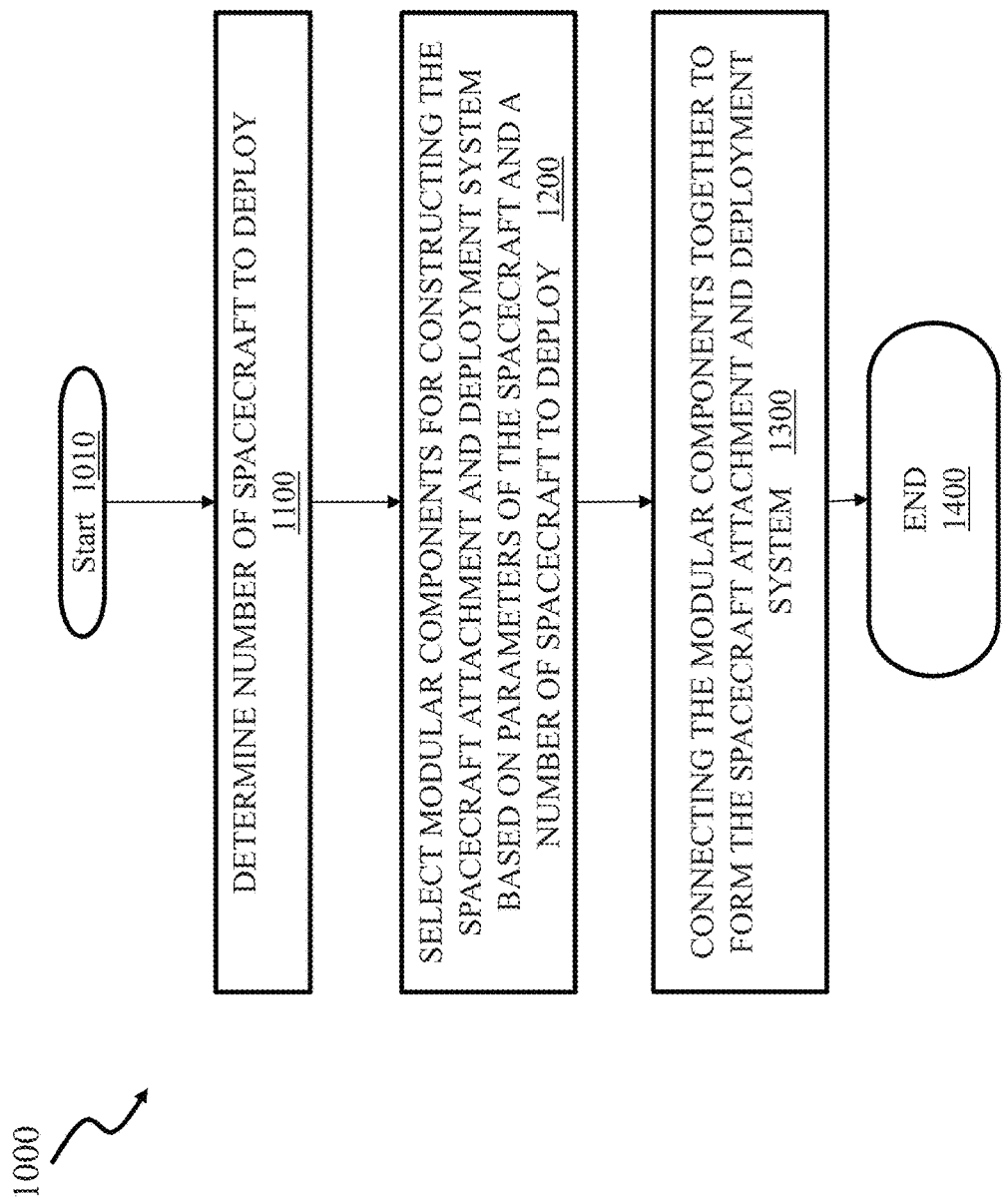
FIG. 10 illustrates a flow diagram of an embodiment of a method of constructing a spacecraft attachment and deployment system carried out according to the principles of the disclosure.

Turning now to FIG. 10, illustrated is a flow diagram of an embodiment of a method 1000 of constructing a spacecraft attachment and deployment system carried out according to the principles of the disclosure. The method begins in a step 1010.

In a step 1100, a number of spacecraft to deploy is determined. This information can be received from a customer or spacecraft designer. Information about deployment of the spacecraft, size, exit speeds, etc., can also be obtained.

In a step 1200, modular components for constructing the spacecraft attachment and deployment system, based on parameters of the spacecrafts and the number of spacecrafts, are selected. A determination of the type of system, for example a T system or a R system, may also be made before determining the modular components. The modular components can include a connecting structure, an actuating assembly, and a deployment mechanism. The method 1000 can also include selecting modular parts of the connecting structure, the actuating assembly, and the deployment mechanism, and assembling the modular parts together to construct the connecting structure, the actuating assembly, and the deployment mechanism.

In a step 1300, the modular components are connected together to form the spacecraft attachment and deployment system. In one embodiment, the selecting and connecting can be based on a deployment strategy of the spacecrafts. For example, independent deployments may be needed for launching in dual or serial configurations. In a step 1400, the method 1000 ends.

Those skilled in the art to which this application relates will appreciate that other and further additions, deletions, substitutions and modifications may be made to the described embodiments.

What is claimed is:

1. A connecting structure of a railed assembly system, comprising a modular actuating assembly attached thereto, the modular actuating assembly comprising:
   a primary pin puller;
   a primary spacecraft stop lever;
   a secondary pin puller; and
   a secondary spacecraft stop lever, wherein the modular actuating assembly is attached to an exit of the connecting structure on any of multiple sides of the connecting structure.

2. The connecting structure of the railed assembly system as recited in claim 1, wherein:
   multiple spacecraft are constrained in the connecting structure of the railed assembly system by the primary spacecraft stop lever during launch and ascent;
   contact of the primary spacecraft stop lever to a first rail of the multiple spacecraft is maintained by a torsion spring of the modular actuating assembly at a lever pivot point of the modular actuating assembly, wherein the torsion spring and lever pivot point are associated with the primary spacecraft stop lever; and
   contact of the secondary spacecraft stop lever to a second rail of the multiple spacecraft opposite the first rail of the multiple spacecraft is maintained by another torsion spring of the modular actuating assembly at another lever pivot point of the modular actuating assembly, wherein the another torsion spring and another lever point are associated with the secondary spacecraft stop lever and wherein the secondary spacecraft stop lever rides along the second rail of the multiple spacecraft during ejection of the multiple spacecraft.

3. The connecting structure of the railed assembly system as recited in claim 2, wherein an electrical signal is sent to the primary pin to allow the primary spacecraft stop lever, using the torsion spring and lever pivot point associated with the primary spacecraft stop lever, to swing up and allow a deployment mechanism attached to the connecting structure to move the multiple spacecraft toward the exit of the connecting structure such that a front one of the multiple spacecraft is ejected from the exit of the connecting structure.

4. The connecting structure of the railed assembly system as recited in claim 3, wherein the secondary pin puller restrains the secondary spacecraft stop lever from opening so that the secondary spacecraft stop lever catches a small gap between the front one of the multiple spacecraft and a next one of the multiple spacecraft, preventing the next one of the multiple spacecraft from being ejected from the exit of the connecting structure.

5. The connecting structure of the railed assembly system as recited in claim 4, wherein another electrical signal is sent to the secondary pin puller to allow the secondary spacecraft stop lever, using the torsion spring and lever pivot point associated with the secondary spacecraft stop lever, to swing up and allow the deployment mechanism to move the multiple spacecraft toward the exit of the connecting structure such that the next one of the multiple spacecraft is ejected from the exit of the connecting structure.

6. The connecting structure of the railed assembly system as recited in claim 1, wherein two connecting structures are connected together.

7. A reconfigurable spacecraft attachment and deployment railed assembly system attached to an adaptor of a launching structure, comprising:
  a connecting structure attached to the railed assembly system;
  a modular actuating assembly attached to the connecting structure, wherein the modular actuating assembly comprises:
    a primary pin puller;
    a primary spacecraft stop lever;
    a secondary pin puller; and
    a secondary spacecraft stop lever, wherein the modular actuating assembly is attached to an exit of the connecting structure on any of multiple sides of the connecting structure; and
  a deployment mechanism.

8. The reconfigurable spacecraft attachment and deployment railed assembly system as recited in claim 7, wherein:
  multiple spacecraft are constrained in the connecting structure of the railed assembly system by the primary spacecraft stop lever during launch and ascent;
  contact of the primary spacecraft stop lever to a first rail of the multiple spacecraft is maintained by a torsion spring of the modular actuating assembly at a lever pivot point of the modular actuating assembly, wherein the torsion spring and lever pivot point are associated with the primary spacecraft stop lever; and
  contact of the secondary spacecraft stop lever to a second rail of the multiple spacecraft opposite the first rail of the multiple spacecraft is maintained by another torsion spring of the modular actuating assembly at another lever pivot point of the modular actuating assembly, wherein the another torsion spring and another lever point are associated with the secondary spacecraft stop lever and wherein the secondary spacecraft stop lever rides along the second rail of the multiple spacecraft during ejection of the multiple spacecraft.

9. The reconfigurable spacecraft attachment and deployment railed assembly system as recited in claim 8, wherein an electrical signal is sent to the primary pin puller to allow the primary spacecraft stop lever, using the torsion spring and lever pivot point associated with the primary spacecraft stop lever, to swing up and allow the deployment mechanism attached to the connecting structure to move the multiple spacecraft toward the exit of the connecting structure such that a front one of the multiple spacecraft is ejected from the exit of the connecting structure.

10. The reconfigurable spacecraft attachment and deployment railed assembly system as recited in claim 9, wherein the secondary pin puller restrains the secondary spacecraft stop lever from opening so that the secondary spacecraft stop lever catches a small gap between the front one of the multiple spacecraft and a next one of the multiple spacecraft, preventing the next one of the multiple spacecraft from being ejected from the exit of the connecting structure.

11. The reconfigurable spacecraft attachment and deployment railed assembly system as recited in claim 10, wherein another electrical signal is sent to the secondary pin puller to allow the secondary spacecraft stop lever, using the torsion spring and lever pivot point associated with the secondary spacecraft stop lever, to swing up and allow the deployment mechanism to move the multiple spacecraft toward the exit of the connecting structure such that the next one of the multiple spacecraft is ejected from the exit of the connecting structure.

12. The reconfigurable spacecraft attachment and deployment railed assembly system as recited in claim 7, wherein two connecting structures are connected together.

13. A method of ejecting multiple spacecraft from a connecting structure, comprising:
  constraining the multiple spacecraft during launch and ascent with a primary spacecraft stop lever of a modular actuating assembly;
  maintaining contact of the primary spacecraft stop lever with a first rail of the multiple spacecraft by a torsion spring of the modular actuating assembly at a lever pivot point of the modular actuating assembly, wherein the torsion spring and lever pivot point are associated with the primary spacecraft stop lever;
  maintaining contact of a secondary spacecraft stop lever of the modular actuating assembly with a second rail of the multiple spacecraft opposite the first rail of the multiple spacecraft by another torsion spring of the modular actuating assembly at another lever point of the modular actuating assembly; wherein:
    the another torsion spring and the another lever pivot point are associated with the secondary spacecraft stop lever;
    the secondary spacecraft stop lever rides along the second rail of the multiple spacecraft during ejection of the multiple spacecraft; and
    each of multiple sides of an exit of the connecting structure is configured to have the modular actuating assembly attached thereto.

14. The method of ejecting multiple spacecraft as recited in claim 13, further comprising sending an electrical signal to a primary pin puller of the modular actuating assembly to allow the primary spacecraft stop lever, using the torsion spring and lever pivot point associated with the primary spacecraft stop lever, to swing up and allow a deployment mechanism attached to the connecting structure to move the multiple spacecraft toward the exit of the connecting structure such that a front one of the multiple spacecraft is ejected from the exit of the connecting structure.

15. The method of ejecting multiple spacecraft as recited in claim 14, further comprising restraining the secondary spacecraft stop lever from opening with a secondary pin puller so that the secondary spacecraft stop lever catches a small gap between the front one of the multiple spacecraft and a next one of the multiple spacecraft, preventing the next one of the multiple spacecraft from being ejected from the exit of the connecting structure.

16. The method of ejecting multiple spacecraft as recited in claim 15, further comprising sending another electrical signal to the secondary pin puller to allow the secondary spacecraft stop lever, using the another torsion spring and lever pivot point associated with the secondary stop lever, to swing up and allow the deployment mechanism to move the multiple spacecraft toward the exit of the connecting structure such that the next one of the multiple spacecraft is ejected from the exit of the connecting structure.

17. The method of ejecting multiple spacecraft as recited in claim 13, wherein two connecting structures are connected together.

* * * * *